US010164498B2

United States Patent
Otsuka

(10) Patent No.: US 10,164,498 B2
(45) Date of Patent: Dec. 25, 2018

(54) FAN DEVICE

(71) Applicant: MINEBEA CO., LTD., Kitasaku-gun, Nagano (JP)

(72) Inventor: Shuichi Otsuka, Nagano (JP)

(73) Assignee: Minebea Co., Ltd., Nagano (JP)

( * ) Notice: Subject to any disclaimer, the term of this patent is extended or adjusted under 35 U.S.C. 154(b) by 200 days.

(21) Appl. No.: 15/095,395

(22) Filed: Apr. 11, 2016

(65) Prior Publication Data

US 2016/0301278 A1 Oct. 13, 2016

(30) Foreign Application Priority Data

Apr. 13, 2015 (JP) .................................. 2015-081522

(51) Int. Cl.
*H02K 5/02* (2006.01)
*H02K 5/10* (2006.01)
*H02K 5/128* (2006.01)

(52) U.S. Cl.
CPC ............... *H02K 5/10* (2013.01); *H02K 5/128* (2013.01)

(58) Field of Classification Search
CPC ................................ H02K 5/10; H02K 5/128
USPC ........................................ 310/43, 87, 88, 89
IPC ................................................. H02K 5/02,5/10
See application file for complete search history.

(56) References Cited

U.S. PATENT DOCUMENTS

| 2005/0012416 A1* | 1/2005 | Huang | F04D 25/06 310/88 |
| 2005/0123423 A1* | 6/2005 | Weisser | F04D 29/083 417/423.7 |
| 2007/0126296 A1* | 6/2007 | Lee | H02K 5/04 310/86 |
| 2007/0145842 A1* | 6/2007 | Zhu | F04D 29/582 310/88 |
| 2012/0319543 A1* | 12/2012 | Adachi | H02K 5/10 310/68 R |
| 2014/0248164 A1* | 9/2014 | Chang | F04D 25/0646 417/354 |
| 2016/0301278 A1* | 10/2016 | Otsuka | H02K 5/10 |

FOREIGN PATENT DOCUMENTS

| JP | H01-290996 A | 11/1989 |
| JP | 2007-174896 A | 7/2007 |
| JP | 2009-284704 A | 12/2009 |
| JP | 3165612 U | 1/2011 |
| JP | 2013-188091 A | 9/2013 |

OTHER PUBLICATIONS

Office Action dated Jul. 27, 2017 in the corresponding Japanese patent application 2015-081522.

* cited by examiner

*Primary Examiner* — John K Kim

(74) *Attorney, Agent, or Firm* — Carrier Blackman & Associates, P.C.; Joseph P. Carrier; Jeffrey T. Gedeon

(57) ABSTRACT

A fan device includes: a stator core having a plurality of salient poles that protrude outwards in a radial direction; a rotor magnet that is rotatably provided outside the stator core; and a dustproof cover mounted to the stator core and positioned between the stator core and the rotor magnet, wherein the dustproof cover has a cylindrical part having an inner surface being provided with one or more convex part, the convex part being fitted into a slot gap between distal ends of adjacent two of the salient poles.

8 Claims, 4 Drawing Sheets

FAN DEVICE

BACKGROUND OF THE INVENTION

1. Field of the Invention

The present invention relates to a fan device configured in consideration of protection against dust and water.

2. Description of the Related Art

As a dustproof and waterproof structure of a fan device, there are known configurations as those disclosed in JP-UM-B-3165612 and JP-A-2013-188091. In JP-UM-B-3165612, a fan device configured to have waterproof and dustproof functions by installing a stator unit in a sealing space of a housing is disclosed. In JP-A-2013-188091, a fan device configured to have waterproof and dustproof functions by a shield case that covers a stator and is made of a non-magnetic material is disclosed.

Since a housing of JP-UM-B-3165612 is configured to be fitted between a shaft cylinder and an inner peripheral wall of a stator unit, the shape of the housing is complicated. Further, in order to fit the housing between the shaft cylinder and the stator, the housing requires high dimensional accuracy and rigidity. Since a shield case of JP-A-2013-188091 is fixed by an outer periphery of a bearing liner and a claw part of a base, high dimensional accuracy and rigidity may be required.

The structure of JP-UM-B-3165612 or JP-A-2013-188091 may be problematic in that a member for performing a dustproof function requires high dimensional accuracy and rigidity, so that manufacturing cost thereof is high.

SUMMARY OF THE INVENTION

One of objects of the present invention is to provide a fan device, which achieves dustproof and waterproof effect with an inexpensive and simple structure.

According to an illustrative embodiment of the present invention, there is provided a fan device including: a stator core having a plurality of salient poles that protrude outwards in a radial direction; a rotor magnet that is rotatably provided outside the stator core; and a dustproof cover mounted to the stator core and positioned between the stator core and the rotor magnet, wherein the dustproof cover has a cylindrical part having an inner surface being provided with one or more convex part, the convex part being fitted into a slot gap between distal ends of adjacent two of the salient poles.

DETAILED DESCRIPTION

Figure 1:
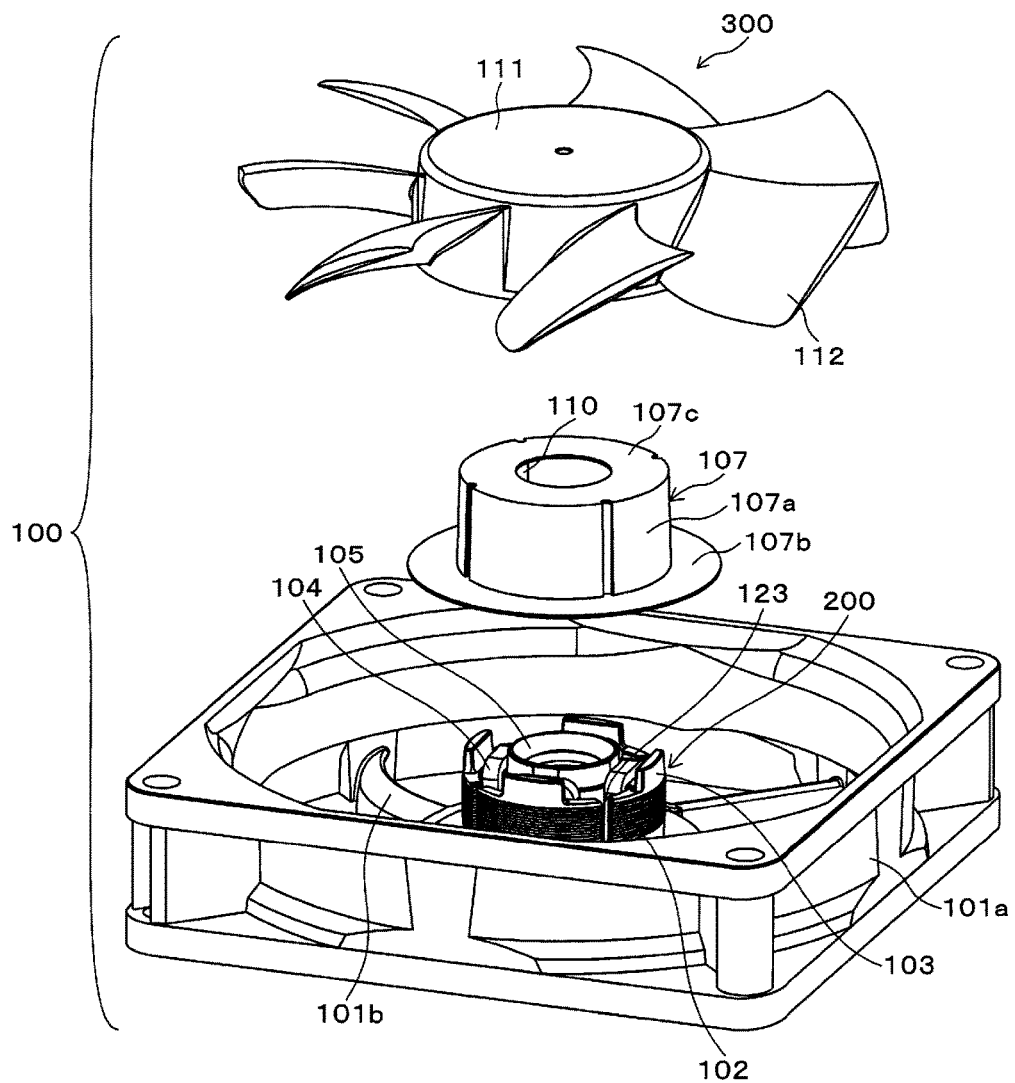
FIG. 1 is an exploded perspective view of an embodiment.
Figure 2:
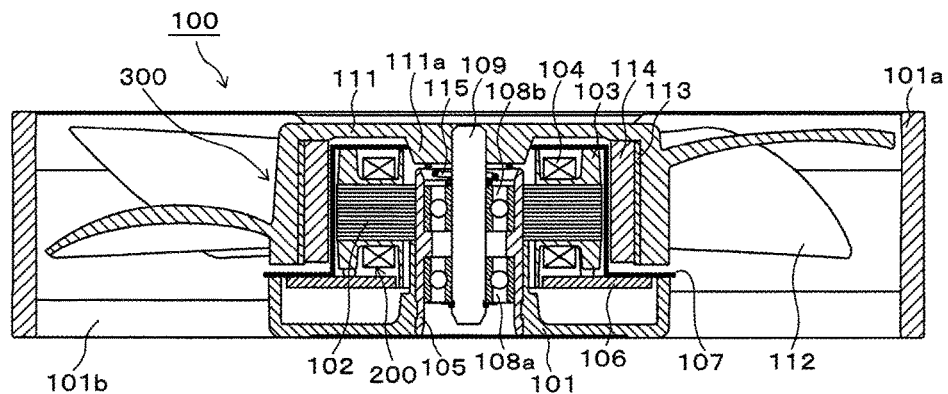
FIG. 2 is a sectional view of the embodiment.

FIG. 1 is an exploded perspective view of a fan device 100 according to an embodiment of the present invention. FIG. 2 is a sectional view of the fan device 100 that is cut in an axial direction thereof. Here, the term "axial direction" is defined as a direction of a rotating axis of the fan device 100.

The fan device 100 is an axial-flow fan, and has a structure of an outer-rotor-type motor including a stator 200 and a rotor 300 rotating outside the stator.

The stator 200 has a stator core 102 and a stator coil 104 wound around a salient pole 120 of the stator core 102. The stator core 102 is fixed to an outer periphery of a cylindrical bearing housing 105. The bearing housing 105 is fixed to a base 101 configuring a case body. The base 101 is made of a resin material, and is formed integrally with an outer case body 101a surrounding an outer periphery of the fan device and a spoke 101b supporting the outer case body 101a.

The stator core 102 has a structure formed by laminating a plurality of plate-shaped soft magnetic materials such as an electrical steel sheet, and is provided with a plurality of salient poles 120 (in this example, four salient poles) in a circumferential direction thereof. The stator coil (drive coil) 104 is wound around each salient pole 120 of the stator core 102 through an insulator 103 made of a resin material. Further, a circuit board 106 on which a drive circuit, a magnetic sensor or the like is mounted is fixed to the insulator 103.

Rolling bearings 108a and 108b are fixed to an inner periphery of the bearing housing 105, so that a shaft 109 is rotatably retained by the rolling bearings 108a and 108b. The rotor 300 is fixed to the shaft 109. The rotor 300 includes a rotor hub 111 integrated with a wing 112 and made of a resin material, a rotor yoke 113 attached to an inside of the rotor hub 111, and a rotor magnet 114. Further, a spring 115 is disposed between the bearing 108b and the rotor hub 111, applying pressure to an inner race of the bearing 108b.

The rotor hub 111 approximately has a cup shape, and the wing 112 is integrally formed around the rotor hub. The cylindrical rotor yoke 113 made of a magnetic material is fixed to the inside of the rotor hub 111, and the approximately cylindrical rotor magnet 114 is fixed to the inside of the rotor yoke 113. The rotor magnet 114 is magnetized such that S and N poles are alternately arranged in a circumferential direction thereof.

Figure 4A:
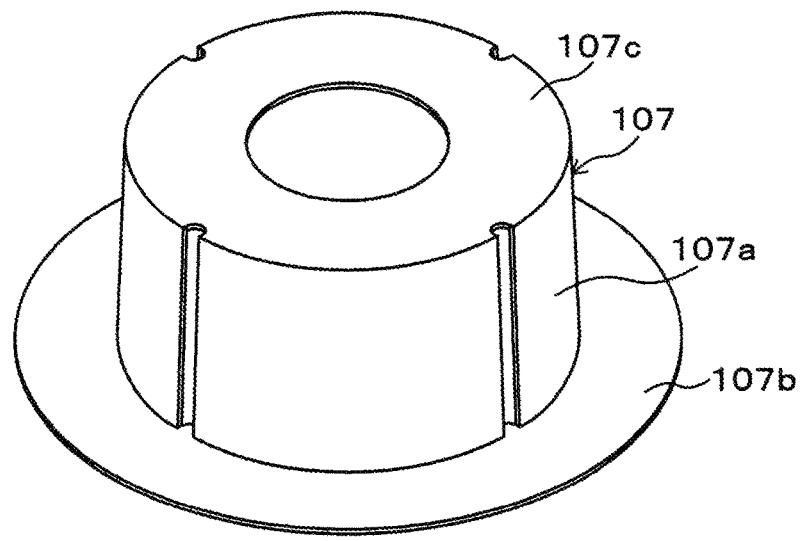
FIGS. 4A and 4B are perspective views of the dustproof cover.
Figure 4B:
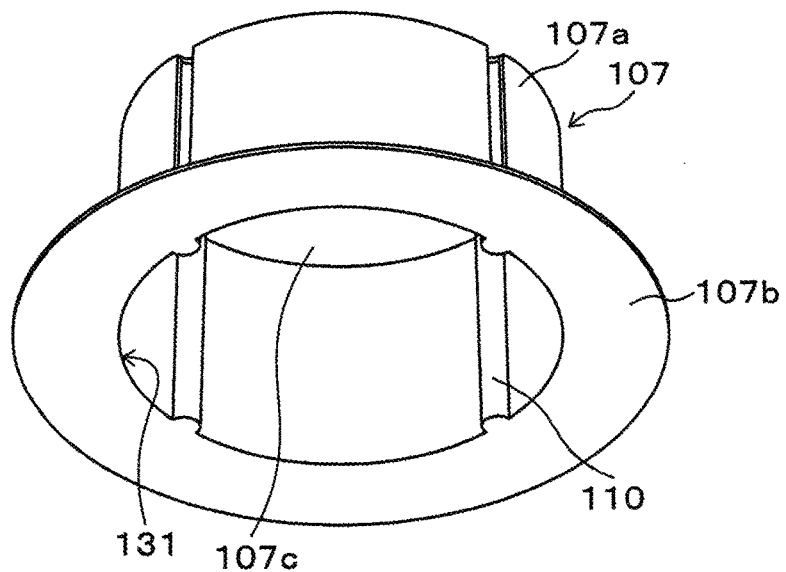
Figure 5:
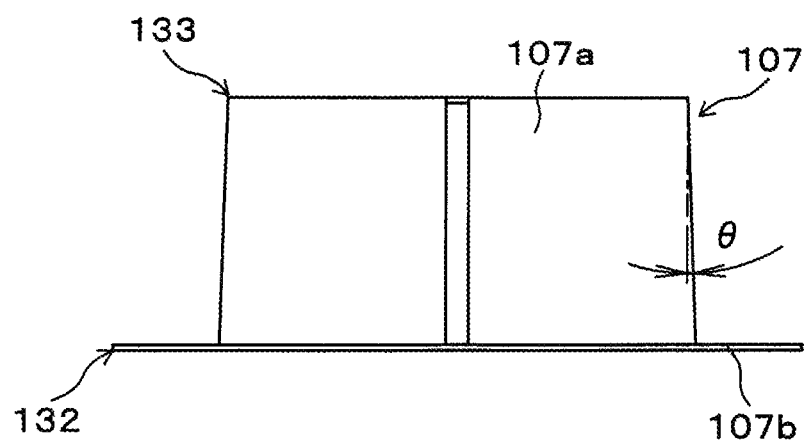
FIG. 5 is a side view of the dustproof cover.

A dustproof cover 107 is mounted, through the insulator 103, to the stator core 102 around which the stator coil 104 is wound. FIGS. 4A and 4B are perspective views of the dustproof cover 107, and FIG. 5 is a side view of the dustproof cover 107 when viewed from a direction perpendicular to an axis. The dustproof cover 107 has a cylindrical barrel part 107a, a brim-shaped outer flange part 107b extending from one end of the barrel part 107a in a direction away from the central axis, and an inward flange part 107c extending from the other end of the barrel part 107a towards the central axis. A film-shaped resin material having transparency and flexibility is pressed into shape to form the dustproof cover 107. As the material of the dustproof cover 107, polypropylene is suitable, but polystyrene, polyethylene, polyethylene terephthalate or the like are available.

Protrusions 110 each having a section of an approximately semi-circular shape are provided on an inner periphery of the barrel part 107a at regular angular positions (positions at an interval of 90 degrees) when viewed from the axial direction. Each protrusion 110 protrudes inwards (towards the central axis) and extends linearly in the axial direction.

Figure 3:
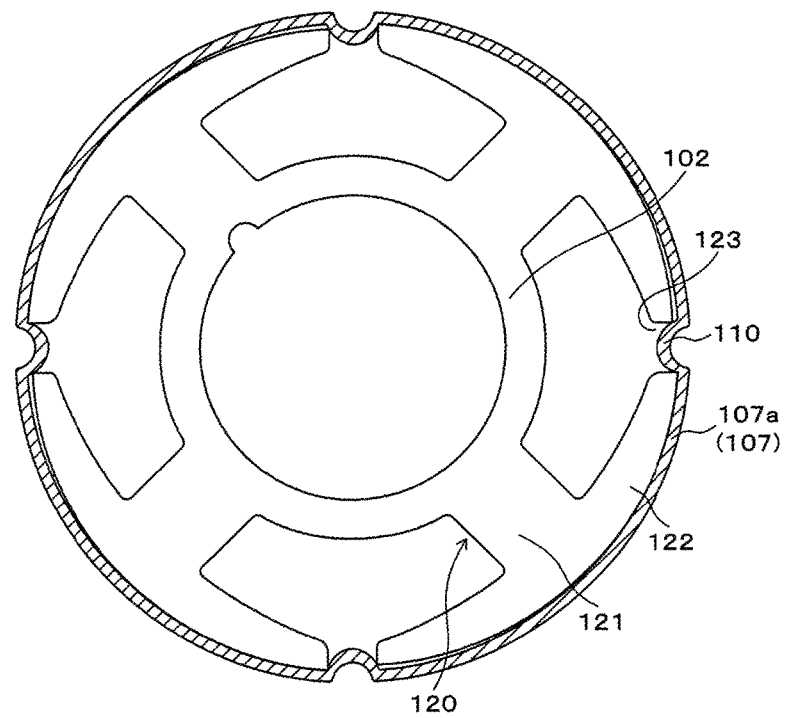
FIG. 3 is a sectional view illustrating a state in which a dustproof cover is mounted to a stator when viewed from an axial direction.

As shown in FIG. 3, the stator core 102 has four salient poles 120. The stator coil 104 is omitted in FIG. 3. Each salient pole 120 has an extending part 121 that extends outwards in a radial direction, namely, in a direction away from the central axis, and a distal end 122 that is provided on a tip of the extending part 121 and expands in an umbrella shape. A slot gap 123 is formed between the distal ends 122 of two adjacent salient poles 120 in the circumferential direction. The slot gap 123 is a gap that is defined between the distal ends 122 of the two salient poles 120 extending in the axial direction. The number of the slot gaps 123 is four, and the position thereof is set at regular angular positions (positions at an interval of 90 degrees) from the axial direction.

As shown in FIG. 3, in the state where the dustproof cover 107 is mounted to the stator core 102, the protrusion 110 of the dustproof cover 107 is fitted into the corresponding slot gap 123. The dustproof cover 107 is fixed to the stator by fitting the protrusion 110 into the slot gap 123. Here, a dimension is set such that a width of the protrusion 110 is slightly larger than a width of the slot gap 123 in the circumferential direction in the state where the protrusion is not fitted into the slot gap. Since the dustproof cover 107 is made of resin that is flexible and deformable, the above-described dimensional relationship allows the protrusion 110 to be press-fitted into the slot gap 123 while being slightly elastically deformed. Further, in the state where the protrusion is not fitted into the slot gap, the width of the protrusion 110 in the circumferential direction may be equal to that width of the slot gap 123.

Moreover, in the state where the dustproof cover 107 is mounted to the stator core 102, as shown in FIG. 2, an inner edge of the inward flange part 107c is configured to be similar to a taper-shaped portion of a boss part 111a of the rotor hub 111 and to maximally prevent dust or water from penetrating into a gap between the inner edge of the inward flange part 107c and the rotor hub 111.

The outer flange part 107b is configured to come into contact with the circuit board 106 and the motor base 101, so that the penetration of dust or water into the circuit board 106 and the air-tightness of the dustproof cover 107 increases. The fan device 100 produces air flow from an upper position to a lower position of FIG. 2. This air flow generates a force to push the outer flange part 107b against the circuit board 106 and the base 101. The dustproof cover 107 is pushed against the stator core 102 by this force, so that the dustproof cover 107 does not become loose.

The dustproof cover 107 may be fixed to the stator core 102 simply by press-fitting the protrusion 110 into the slot gap 123. The fixing structure may be additionally reinforced using an adhesive.

As shown in FIG. 5, the barrel part 107a of the dustproof cover 107 is not a perfect cylinder, but has a tapered shape with a taper angle θ such that a diameter of the barrel part is slightly but gradually increased towards the outer flange part 107b. In this example, the dimension is set such that an inner diameter of the barrel part 107a is larger than an outer diameter of the stator 200 at the outer flange part 107b while the inner diameter of the barrel part 107a is smaller than the outer diameter of the stator 200 at the inward flange part 107c. By such a structure, when the dustproof cover 107 is mounted to the stator 200, the outer flange part 107b of the barrel part 107a has the large inner diameter and thereby is easily mounted to the stator 200. Further, if the dustproof cover 107 is continuously pushed against the stator 200 to be mounted thereto, a contact degree between the barrel part 107a and the stator 200 is increased, so that a portion of the barrel part 107a having a reduced diameter is enlarged by the stator 200 to be elastically expanded in diameter, and a mounting operation is completed in the state where the barrel part 107a is elastically and firmly tightened on the stator 200. Therefore, it is easy to perform the mounting operation and it is well-adhered after the mounting operation is completed.

Waterproofing and dustproofing of the stator coil may be attained with an inexpensive and simple structure. Further, it is easy to mount the dustproof cover 107 to the stator core 102. Since the dustproof cover 107 is fixed to the stator core 102 by fitting the protrusion 110 of the dustproof cover 107 into the slot gap 123, a simple and reliable structure is obtained while the mounting process is simple. In particular, since the dustproof cover 107 has a tapered shape, it is easily mounted to the stator core 102. In this tapered shape, the small diameter portion is elastically fitted into the stator core 102, so that a high mounting strength as well as an easy mounting operation is achieved. Further, the dustproof cover 107 is formed by press shaping but has the tapered shape, so that it is easy to release the dustproof cover from a press mold and thereby the invention is advantageous in the manufacturing process. Furthermore, since the dustproof cover 107 is transparent and it is possible to visually see the interior thereof, it is easy to find the abnormality that occurs during the assembly work and it is easily checked by the naked eye.

Edge portions denoted by reference numeral 131 of FIG. 4 and reference numerals 132 and 133 of FIG. 5 may have an R shape. The section of the protrusion 110 may have a rectangular shape or the like without being limited to the semi-circular shape. In the above-described example, the number of the protrusions 110 is prepared to correspond to the number of the slot gaps 123, but the number of the protrusions 110 may be less than the number of the slot gaps 123. For example, even if the number of the protrusion 110 is one, it is possible to obtain a function of fixing the dustproof cover 107 to the stator core 102.

As described with reference to the embodiment, according to the present invention, there is provided a fan device including: a stator core having a plurality of salient poles that protrude outwards in a radial direction; a rotor magnet that is rotatably provided outside the stator core; and a dustproof cover mounted to the stator core and positioned between the stator core and the rotor magnet, wherein the dustproof cover has a cylindrical part having an inner surface being provided with one or more convex part, the convex part being fitted into a slot gap between distal ends of adjacent two of the salient poles.

According to this configuration, a dustproof cover is fixed to a stator core by fitting a convex part of the dustproof cover in a slot gap between adjacent salient poles of the stator core. Thus, such a structure is simple and can be obtained at low cost without requiring high dimensional accuracy. Herein, the term "slot gap" means a gap between a circumferential edge of one of adjacent salient-pole distal ends and a circumferential edge of the remaining one of the adjacent salient-pole distal ends.

The convex part is preferably formed in the shape of a protrusion that extends in axial direction. According to this configuration, since the protrusion provided inside the dustproof cover is fitted into the slot gap of the stator core, the dustproof cover is linearly fixed to the stator, and thereby it is guaranteed that the dustproof cover is more firmly coupled with the stator core.

In the state where the fitting operation is not performed, it is preferable that a width of the convex part is equal to or greater than a width of the slot gap in the circumferential direction. According to this embodiment, since the convex part is fitted into the slot gap, the mounting strength of the dustproof cover to the stator is increased.

It is preferable that the dustproof cover is made of flexible resin. According to this embodiment, since the convex part of the dustproof cover is fitted elastically into the slot gap of the stator, it is possible to facilitate the fitting operation and increase a fitting strength.

A cylindrical part is preferably tapered such that a diameter thereof enlarges towards a direction where it is mounted to the stator core. According to this embodiment, it is easy to mount the dustproof cover to the stator core, and it is possible to obtain a high mounting strength because a small diameter portion of the dustproof cover tightens onto the stator core.

The dustproof cover is preferably made of a transparent material. According to this embodiment, the dustproof cover is formed transparent and thereby the stator core may be visually inspected. Consequently, it is easy to find an abnormality that occurs during assembly work, in addition to allowing the stator core to be easily checked by the naked eye.

According to the present invention, it is possible to provide a fan device that has improved dustproof and waterproof features with an inexpensive and simple structure.

What is claimed is:

1. A fan device, comprising:
   a stator core having a plurality of salient poles that protrude outwards in a radial direction;
   a rotor magnet that is rotatably provided outside the stator core; and
   a dustproof cover mounted to the stator core and positioned between the stator core and the rotor magnet,
   wherein the dustproof cover has a cylindrical part having an outer wall with an inner surface being provided with one or more convex part, the convex part being fitted into a slot gap between distal ends of adjacent two of the salient poles, and
   wherein the outer wall of the cylindrical part of the dustproof cover has a tapered shape extending along the entire length of the outer wall such that a diameter thereof enlarges towards a direction in which the cylindrical part is mounted to the stator core.

2. The fan device according to claim 1,
   wherein the convex part includes a protrusion extending in an axial direction.

3. The fan device according to claim 1,
   wherein a width of the convex part is equal to or greater than a width of the slot gap in a circumferential direction in a state where the convex part is unfitted into the slot gap.

4. The fan device according to claim 1,
   wherein the dustproof cover is made of flexible resin.

5. A fan device, comprising:
   a stator core having a plurality of salient poles that protrude outwards in a radial direction;
   a rotor magnet that is rotatably provided outside the stator core; and
   a dustproof cover mounted to the stator core and positioned between the stator core and the rotor magnet,
   wherein the dustproof cover has a cylindrical part having an inner surface being provided with one or more convex part, the convex part being fitted into a slot gap between distal ends of adjacent two of the salient poles, and
   wherein the dustproof cover is made of a transparent material.

6. The fan device according to claim 5,
   wherein the convex part includes a protrusion extending in an axial direction.

7. The fan device according to claim 5,
   wherein a width of the convex part is equal to or greater than a width of the slot gap in a circumferential direction in a state where the convex part is unfitted into the slot gap.

8. The fan device according to claim 5,
   wherein the dustproof cover is made of flexible resin.

* * * * *